United States Patent [19]

Saito

[11] Patent Number: 5,055,170

[45] Date of Patent: Oct. 8, 1991

[54] ION CONCENTRATION SETTING APPARATUS FOR IONIC WATER GENERATOR

[75] Inventor: Shiro Saito, Aichi, Japan

[73] Assignee: Inax Corporation, Tokoname, Japan

[21] Appl. No.: 506,067

[22] Filed: Apr. 9, 1990

[30] Foreign Application Priority Data

May 2, 1989 [JP] Japan .................................. 1-113382

[51] Int. Cl.⁵ ........................ C25B 15/00; C25D 21/00
[52] U.S. Cl. .................................. 204/228; 204/400; 204/406; 204/416
[58] Field of Search ............... 204/228, 400, 406, 416

[56] References Cited

U.S. PATENT DOCUMENTS

| 3,751,355 | 8/1973 | Mandroian | 204/228 |
| 4,786,379 | 11/1988 | Barnett | 204/228 |
| 4,810,344 | 3/1989 | Okazaki | 204/228 |
| 4,836,903 | 6/1989 | Cawlfield | 204/228 |

*Primary Examiner*—John F. Niebling
*Assistant Examiner*—Caroline Koestner
*Attorney, Agent, or Firm*—Kanesaka and Takeuchi

[57] ABSTRACT

An apparatus for setting the ion concentration in an ionic water generator which separates drink water between alkaline ionic water and an acidic ionic water by applying a DC voltage between electrodes in an electrolytic cell which are partitioned by an ion-exchange membrane apparatus comprises a device for measuring voltage drop at a portion leading to the electrolytic cell which is caused when a reference voltage is applied, and a calculator for calculating voltage $Vx$ which is applied to the electrolytic cell to adjust ion concentration to a desired value from a proportion $k$ of the voltage drop which is calculated by application of the reference voltage to water to be examined relative to the reference voltage drop caused by application of the reference voltage to reference water and a set voltage $Vn$ which corresponds to the desired ion concentration on the basis of the following equation:

$$Vx = k \times Vn.$$

6 Claims, 7 Drawing Sheets

ION CONCENTRATION SETTING APPARATUS FOR IONIC WATER GENERATOR

BACKGROUND OF THE INVENTION

1. Field of the Invention

The present invention relates to an ion concentration setting apparatus for an ionic water generator which is capable of constantly generating alkaline ionic water and acidic ionic water having a desired concentration even from drink water such as city water, which has a different resistance in localities in accordance with kind and ratio of impurities mixed with water.

2. Description of the Prior Art

In a general ionic water generator, drink water such as city water is supplied to an electrolytic cell which is partitioned by an ion-exchange membrane and a DC voltage is applied between minus electrode and positive electrode disposed with the ion-exchange membrane therebetween. With the application of the voltage, alkaline ions such as calcium and sodium gather to the negative electrode side through the ion-exchange membrane, while acidic ions such as carbonic acid and chlorine gather to the positive electrode side through the ion-exchange membrane. Alkali ionic water, which has a swelling effect for softening things, a dissolving effect for dissolving things and a heat conducting effect for transferring heat quickly, is widely used because it advantageously enhances health of a human body and improves dyeing effect and sense of taste. Acidic ionic water, which has astringency for constricting things, a bleaching property for cleaning things and a disinfection, is used for beauty culture, cooking, sanitation, cleaning, etc.

The effect of such ionic water varies in accordance with the ion concentration. Therefore, in order to meet needs of a wide range of customers, it is important to adjust the concentration of the ionic water produced by selective switching thereof.

As well known, the concentration of ionic water is proportional to the value of the electrolytic current which flows in the electrolytic cell. For this reason, in a conventional ionic water generator, the voltage to be applied is sequentially set in advance, and the ion concentration is varied by varying the voltage to be applied.

Drink water supplied from city water has a quite different quality (particularly, the content of conductive substances represented by the resistivity) in localities because type and amount of impurities contained therein vary with districts. The electric resistivity of drink water therefore also varies with districts. Since the electric resistivity of drink water varies with districts, the electrolytic current (which flows from the positive pole to the negative pole through water in the electrolytic cell) caused by the application of a predetermined voltage to the electrolytic cell is different in accordance with the electric resistivity, thereby disadvantageously making the ion concentration of the ionic water produced at a predetermined voltage non-uniform. More specifically, in a conventional ionic water generator which controls the ion concentration by selectively switching the voltages to be applied to the electrolytic cell which are sequentially set in advance, the ion concentration varies with drink waters of respective districts, and it is actually impossible to obtain a constant ion concentration in any district by allying a constant voltage thereto.

OBJECT AND SUMMARY OF THE INVENTION

Accordingly, it is an object of the present invention to provide an ion concentration setting apparatus for an ionic water generator which is capable of providing ionic water having an intended ion concentration when it is installed in districts where city water have different qualities from each other.

It is another object of the present invention to provide an ion concentration setting apparatus for an ionic water generator which is capable of providing a constant ion concentration when an ion concentration change-over switch is in the same range even if the ion generator is installed in districts where drink water have different resistances from each other.

It is still another object of the present invention to provide an ion concentration setting apparatus for an ionic water generator which facilitates operation without causing trouble to the user.

It is a further object of the present invention to provide an ion concentration setting apparatus for an ionic water generator which is capable of continuously correcting ion concentration to the right value during use, thereby providing a high-accuracy ionic water generator.

To achieve this aim, the present invention provides an apparatus for setting ion concentration in an ionic water generator which separates drink water between an alkaline ionic water and acidic ionic water by applying a DC voltage between the electrodes in an electrolytic cell which are partitioned by an ion-exchange membrane. The apparatus comprises a device for measuring the voltage drop between specific portions which lead into the electrolytic cell when a reference voltage is applied, and a calculator for calculating voltage Vx which is applied to the electrolytic cell to adjust the ion concentration to a desired value from a proportion k, which is a proportion of the voltage drop between the specific portions caused by the application of a reference voltage to a water to be examined and relative to the reference voltage drop between the specific portions caused by the application of the reference voltage to reference water and a set voltage Vn which corresponds to a desired ion concentration, on the basis of the following equation:

$$Vx = k \times Vn$$

The voltage drop between the specific portions which lead into the electrolytic cell is linearly different in accordance with the voltage applied to the electrolytic cell. In addition, drink water has different resistances in localities. Therefore, the voltage drop between the specific portions of drink water in each district is similar and is obtained by moving the voltage drop value as a whole in parallel to each other in correspondence with the resistances of respective drink water.

On these assumptions, voltage drop of the examined water caused by the application of the reference voltage is measured in the present invention, and the proportion k of the voltage drop caused by the application of the reference voltage to the water to be examined relative to the voltage drop caused by the application of the reference voltage to the reference water is obtained by comparison. That is, to obtain k is equivalent to obtain the proportion of the resistance of water to be examined and the resistance of the reference water In order to make the value of the current which flows on the electrolytic cell constant in the reference water and the water to be examined, the voltage obtained by multiplying the set voltage by k is applied. In this way, it is possible to apply a constant analytic current to drink water which has a different resistance in localities. It is well known that the ion concentration of drink water definitively corresponds to an analytic current. Therefore, according to the present invention it is possible to obtain a constant ion concentration from drink water in any district.

DESCRIPTION OF THE PREFERRED EMBODIMENT

Figure 1:
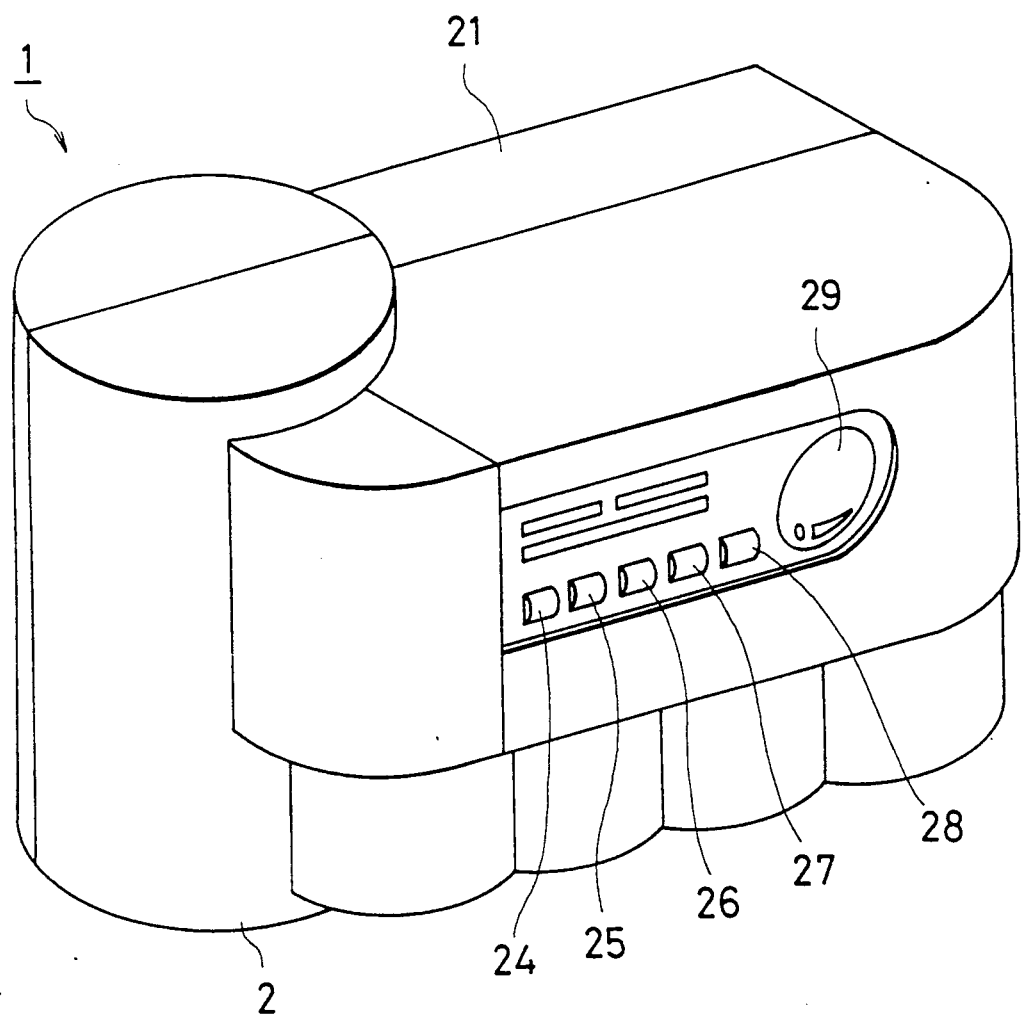
FIG. 1 is a perspective view of an ionic water generator.
Figure 2:
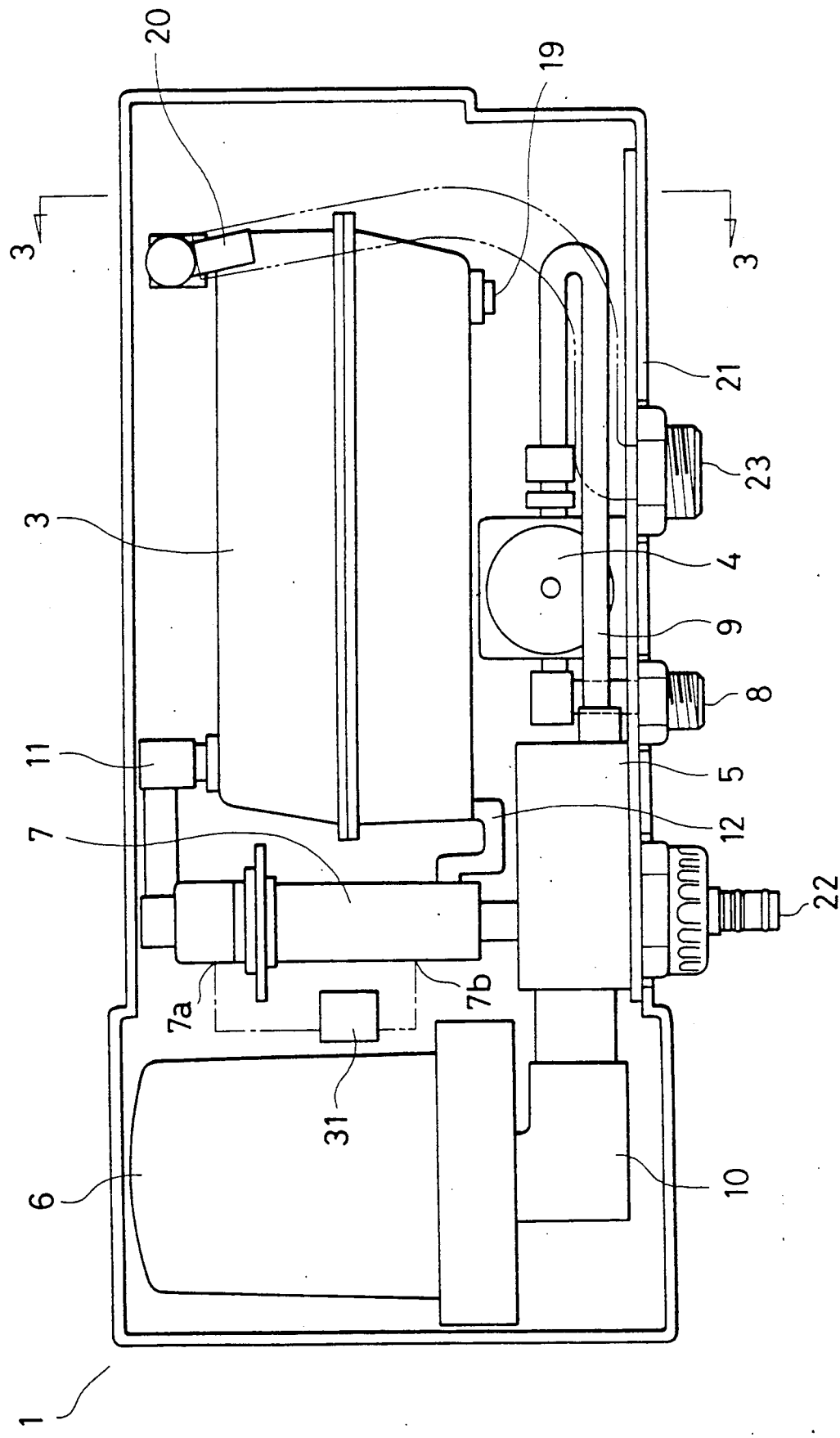
FIG. 2 is a front elevational view of an ionic water generator with a case body on the front side removed.
Figure 3:
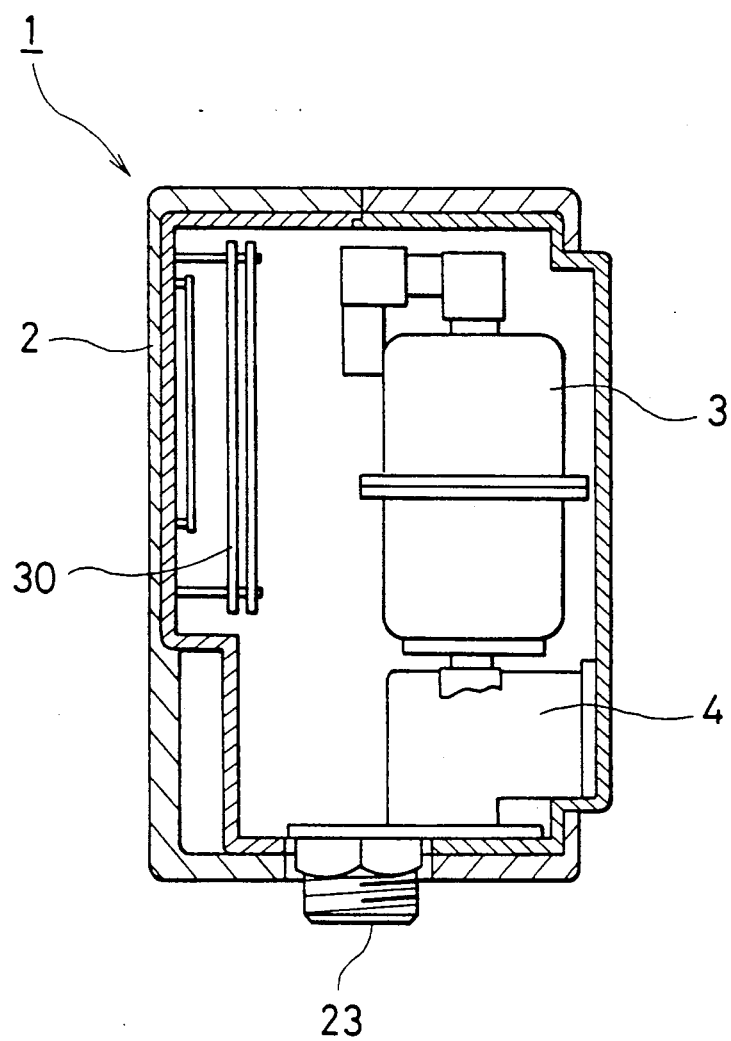
FIG. 3 is a sectional view of the ionic water generator taken along the line 3—3 in FIG. 2.

As shown in FIGS. 2 and 3, in an ionic water generator 1, mechanical parts such as an electrolytic cell 3, a solenoid valve 4, a branch tap 5, a water purifier 6 and a water conduit 7 are provided. Drink water such as city water supplied from an inlet 8 flows into the branch tap 5 through the solenoid valve 4 and a communicating tube 9 and is supplied to the water purifier 6 through a water supply passage provided in a communicating member 10. After water is purified, water is returned to the branch tap 5 through a water discharge passage in the communicating member 10 and is supplied to the water conduit 7. The water pipe 7 supplies purified drink water to the analytic cell 3 through branch water supply pipes 11 and 12.

Figure 4:
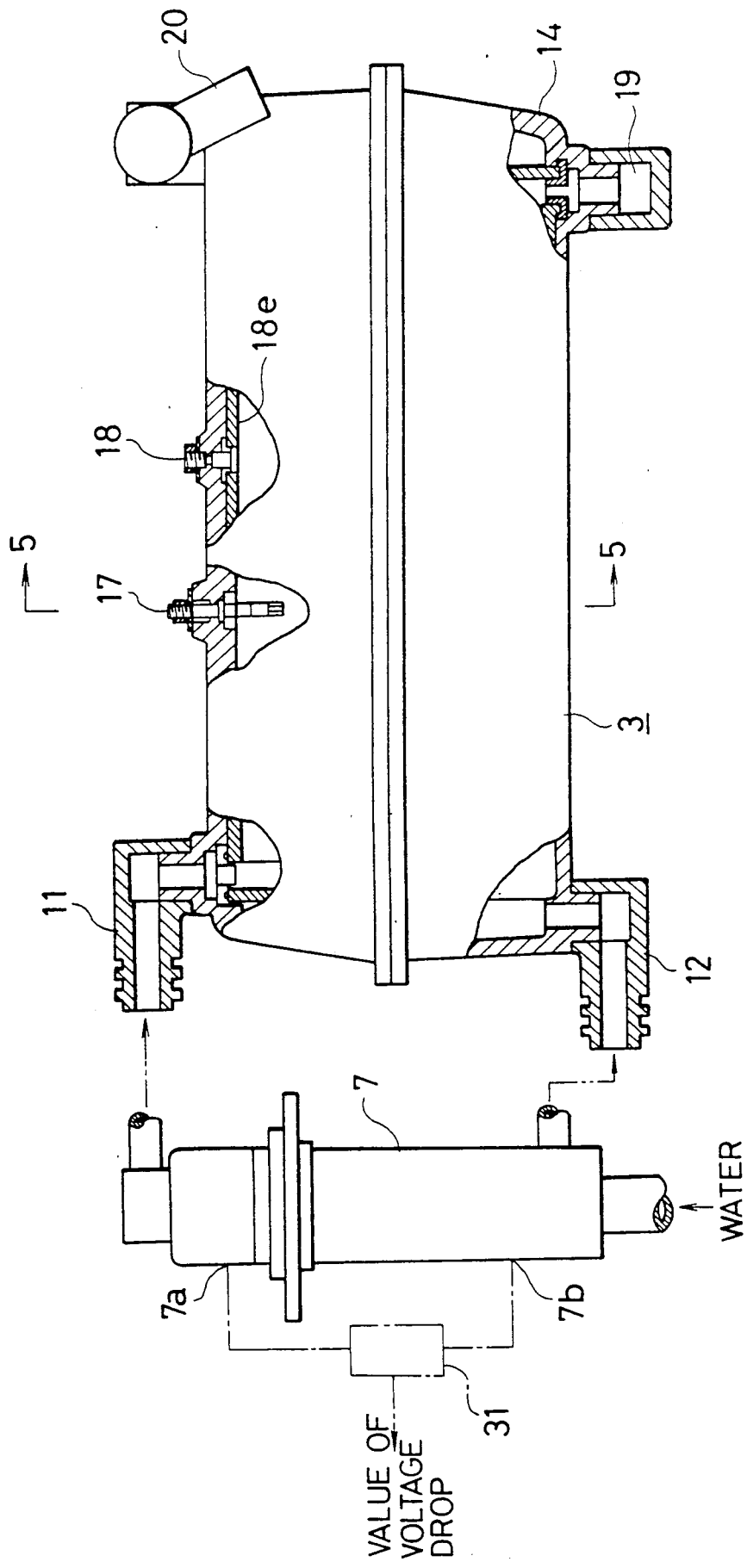
FIG. 4 is a partially sectional elevational view of an electrolytic cell.
Figure 5:
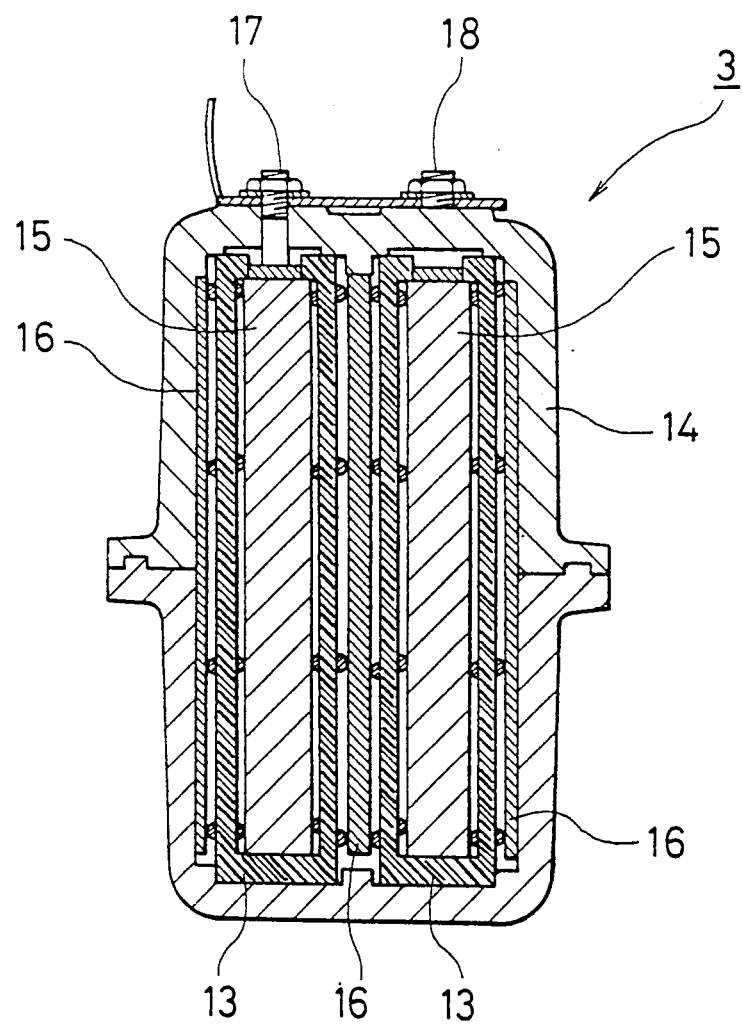
FIG. 5 is a vertically sectional view of an electrolytic cell taken along line 5—5 in FIG. 4.

The electrolytic cell 3 is shown in the partially sectional elevational view of FIG. 4 and the vertically sectional side elevational view of FIG. 5. In the electrolytic cell 3 in this embodiment, two box-shaped ion-exchange membranes 13 are provided in a case 14, thereby defining the interior of the electrolytic cell 3 into five chambers by the ion-exchange membranes 13. Positive electrodes 15 are disposed in the box-shaped ion-exchange membranes 13, and negative electrodes 16 are disposed in the chambers adjacent to the ion-exchange membranes 13. In other words, the negative electrode, the positive electrode, the negative electrode, the positive electrode and the negative electrode are arranged in that order in the parallel five chambers, as shown in FIG. 5. The reference numeral 17 represents a connecting terminal of the negative electrode 16 and conduction is established with each negative electrode 16 by a conductive member (not shown). The reference numeral 18 represents a connecting terminal of the positive electrode 15 and conduction is established with each positive electrode through a conductive member 18e, as shown in FIG. 4.

The branch water supply pipe 11 communicates with one end side of the positive chamber in which the positive electrode 15 is disposed. The other end side of the positive chamber communicates with an acidic ionic water discharge 19. The branch water supply pipe 12 communicates with one end side of the negative chamber in which the negative electrode 16 is disposed. The other end side of the positive chamber communicates with an alkaline ionic water discharge 20. The acidic ionic water discharge 19 and the alkaline ionic water discharge 20 are connected by pipes to an acidic water outlet 22 and an alkaline water outlet 23, respectively, provided on a body case 21 on the back side of the ionic water generator 1.

As electric parts, the ionic water generator 1 is provided with ion concentration change-over switches 24 to 28, and an on-off change-over switch 29 for the solenoid valve 4 on the front surface of a body case 2 of the ionic water generator 1. These switches 24 to 29 are connected to an electric circuit substrate 30 shown in FIG. 3 by wiring. The ionic water generator 1 of this embodiment is provided with a voltmeter 31 for measuring the voltage drop between specific portions, i.e., two points 7a, 7b which are situated away from each other by 40 mm in this embodiment in the water conduit 7 leading to the electrolytic cell 3, as shown in FIGS. 2 and 4. The voltmeter 31 measures potential difference between the electrodes (not shown) disposed at the points 7a, 7b in the water conduit 7. When a negative voltage is applied to the terminal 17 and a positive voltage is applied to the terminal 18, the electric field generated between the terminals 17, 18 is propagated to water in the water conduit 7, whereby a potential difference is produced between the points 7a and 7b. The voltmeter detects the potential difference. The potential difference varies with a change in the voltage applied between the terminals 17 and 18. The potential difference also changes with the resistivity of water in the water conduit 7.

Figure 6:
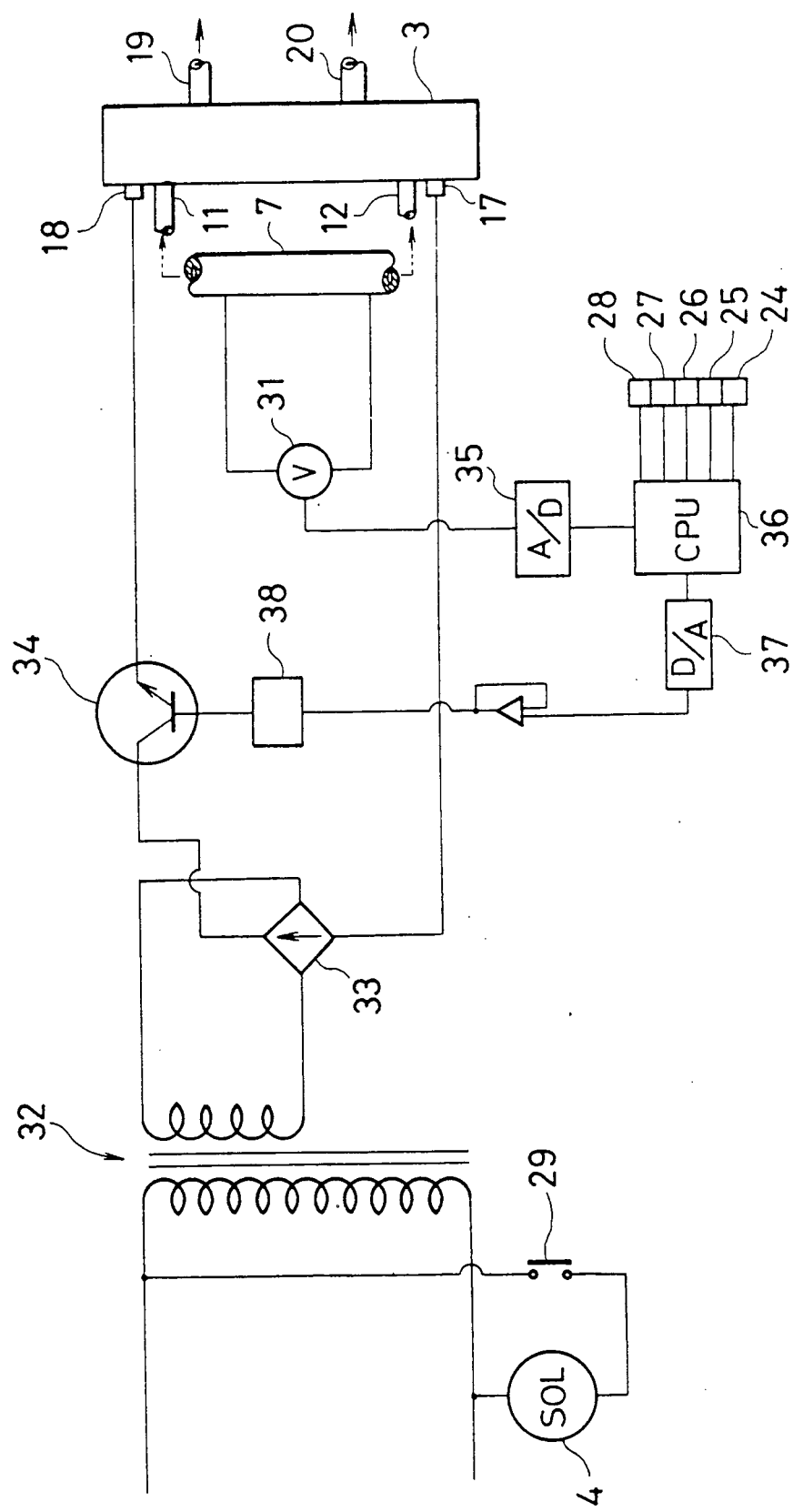
FIG. 6 is an electric circuitry diagram of an ionic water generator.

The circuit mounted on the electric circuit substrate 30 has a structure such as that shown in FIG. 6. In FIG. 6, the reference numeral 32 represents a transformer lowering the supply voltage 100 V to 42 V. To the primary coil side of the transformer 32 is connected a circuit in which the solenoid valve 4 and the switch 29 for on-off control of the solenoid valve 4 are connected in series. To the secondary coil side of the transformer 32 is connected a rectifier 33 for converting an AC into a DC. The output terminal on the positive side of the rectifier 33 is connected to the positive terminal 18 of the electrolytic cell 3 through an NPN type transistor 34. The negative terminal 17 of the electrolytic cell 3 is connected to the output terminal on the negative side of the rectifier 33. The rectifier 33, the transistor 34 and the electrolytic cell constitute a closed magnetic circuit.

The output of the voltmeter 31 for measuring the voltage drop between the distant two points in the water conduit 7 is supplied to a central processor unit (CPU) 36 through an A/D converter 35. The CPU 36 calculates the voltage value (electrolytic voltage) applied to the electrolytic cell 3 in order to set the ion concentration which will be described later, and the output side of the CPU 36 is connected to a controller 38 through a D/A converter 37. The controller controls the base voltage of the transistor 34 in correspondence with the result of the calculation, thereby controlling the output voltage of the transistor 34, namely, the voltage applied to the electrolytic cell 3.

A process for setting the ion concentration in the ionic water generator 1 having the above-described circuit structure will now be explained.

Reference water (e.g., drink water of city water in Tokyo) is first supplied to the electrolytic cell 3 through the water conduit 7 and the water supply pipes 11, 12, and a predetermined reference voltage $V_A$ is applied between the connecting terminal 17 on the negative side of the electrolytic cell 3 and the connecting terminal 18 on the positive side thereof. In order to apply the reference voltage $V_A$, the reference voltage signal from the CPU 36 is converted to an analog signal by the D/A converter 37 and the analog signal is supplied to the controller 38 so as to adjust the base voltage of the transistor 34 in correspondence with the reference voltage. The voltage drop Vo between the two points which are distant from each other by 40 mm in this embodiment in the water conduit 7 leading to the electrolytic cell 3 is measured by the voltmeter 31 when the reference voltage $V_A$ is applied, and the measured value is stored in the CPU 36.

Water to be measured (e.g., drink water of city water in Osaka at which the ionic water generator 1 is installed) is then supplied to the electrolytic cell 3. The voltage drop Vs in the water conduit 7 leading to the electrolytic cell 3 is measured by the voltmeter 31 when the reference voltage $V_A$ is applied, and the measured value is output to the CPU 36 in the same way as in the reference water. In ordinary cases, since the resistivity of the examined water is different from that of the reference water, the voltages Vs and Vo takes different values.

The CPU 36 obtains the proportion k of the voltage drop Vs of the examined water to the voltage drop Vo of the reference water, namely, $$k = Vo/Vs \quad (1)$$

Figure 7:
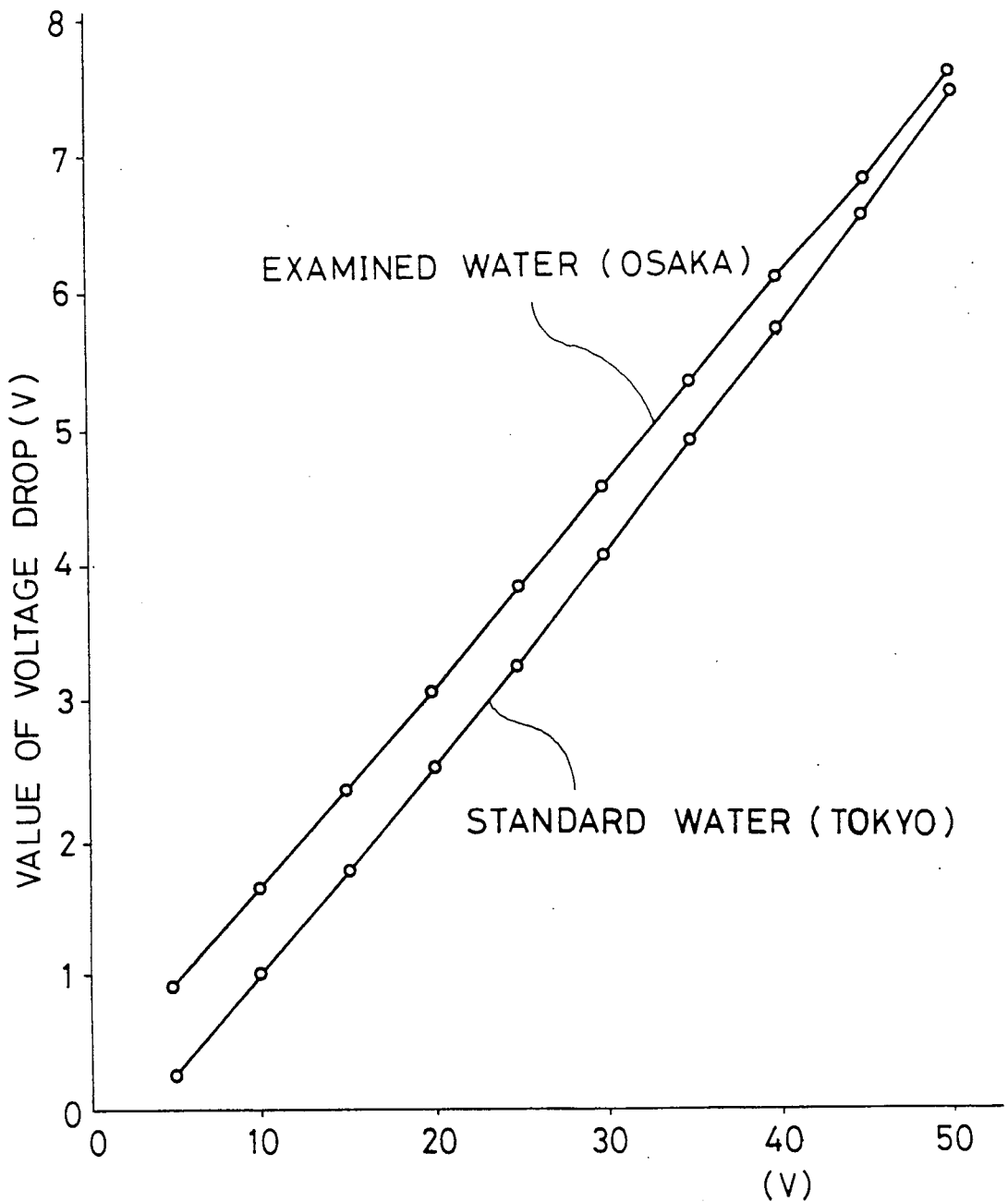
FIG. 7 is a graph showing the results of the experiment of voltage drop.

To obtain k means to obtain the proportion of the resistance of the examined water to the resistance of the reference water. This is also clear from the result of the experiment shown in FIG. 7. FIG. 7 shows the change in the voltage drop at the specified points in the reference water and the examined water.

As is clear from FIG. 7, when the voltage applied to the terminals 17, 18 of the electrolytic cell 3 is varied, the potential difference between the points 7a and 7b linearly changes both in the reference water and the examined water. The gradient of the voltage drop line of the reference water is substantially the same as that of the examined water. The voltage drop line of the reference water is substantially the same as the line obtained by shifting the voltage drops of the reference water slightly upwardly. Accordingly, if the proportion k of the voltage drop Vo of the reference water and the voltage drop Vs of the examined water caused by the application of the reference voltage is obtained, it is possible to obtain the proportion of the resistance of the reference water to the resistance of the examined water.

This fact means that in order to make the electrolytic current flowing the electrolytic cell 3 constant between the reference water and the water to be examined, the voltage Vx obtained by multiplying the voltage Vn applied to the reference water by k is applied. That is, $$Vx = k \times Vn \quad (2)$$

is obtained. This calculation is executed by the CPU 36.

When the switch 24 is pressed down, the predetermined voltage Vn is input to the CPU 36. "The predetermined voltage" refers to a voltage set for obtaining the ionic water having a predetermined ionic concentration in the reference water. The change-over switches 25, 26, 27 and 28 are provided for inputting different voltages to the CPU 36 for obtaining different ionic waters from the reference water. For example the change-over switch 25 is provided for obtaining alkaline water having a hydrogen ion concentration of pH 8, and when the change-over switch 25 is pressed down, a voltage of 16 V is input to the CPU 36. The change-over switch 26 is provided for obtaining an alkaline water of pH 9, and when the change-over switch 25 is pressed down, a voltage of 24V is input to the CPU 36. Similarly, when the change-over switches 24, 27 and 28 are pressed down, different voltages are input to the CPU 36.

Accordingly, the user of the ionic water generator 1 has only to press down one of the switches 24 to 28 as desired in order to set the ion concentration. The CPU 36 calculates the value of Vx on the basis of the equation (2) from the preset voltage Vn which is set in correspondence with the change-over switches 24 to 28. The value of Vx is converted into an analog signal by the D/A converter 37 and is output to the controller 38. The controller 38 controls the base voltage of the transistor 34 so as to adjust the voltage on the output side of the transistor 34, namely, the electrolytic voltage Vx applied to the terminals 17, 18 of the electrolytic cell 3 to Vx. In other words, the electrolytic voltage of Vx is applied to the electrolytic cell 3.

In this way, it is possible to make the electrolytic current which flows in the electrolytic cell 3 constant even if water to be examined has different resistance in localities as in the reference water. It is well known that the ion concentration of drink water definitively and linearly corresponds to the electrolytic current. Therefore, the ionic water generator 1 of this embodiment is capable of providing alkaline ionic water and acidic ionic water having a constant ion concentration in correspondence with the change-over switched 24 to 28 from the drink water in any district.

In the invention, it is possible to automatically correct the ion concentration during the use of the ionic water generator 1 by continuous calculations of the equations (1) and (2).

What is claimed is:

1. An apparatus for setting ion concentration in an ionic water generator including a water conduit and an electrolytic cell communicating with the water conduit, said electrolytic cell having at least one set of positive and negative electrodes and an ion-exchange membrane situated between the positive and negative electrodes to separate the same, said apparatus comprising, means for measuring voltage drop of water in the water conduit, a memory connected to the measuring means, said memory memorizing voltage drop measured by the measuring means when reference water is supplied to the water conduit, a calculator for calculating a voltage Vx to be applied to the electrodes in the electrolytic cell to adjust ion concentration based on a set voltage Vn which corresponds to a desired ion concentration in reference water and a proportion k on the basis of the following equation:

$Vx = k \times Vn$, said proportion k being a proportion of voltage drop measured by means of the measuring means when applying reference voltage and using water to be measured relative to voltage drop measured by means of the measuring means when applying reference voltage and using reference water, and means for applying said voltage Vx calculated by the calculator to said electrodes in the electrolytic cell so that ionic water with a desired concentration is supplied regardless of quality of water.

2. An apparatus according to claim 1, wherein said measuring means includes a pair of electrodes disposed in the water conduit, said electrodes being situated away from each other for a predetermined distance to measure the voltage drop therebetween, said reference voltage being applied to the electrodes in the electrolytic cell when measuring the voltage drop.

3. An apparatus according to claim 1, wherein said electrolytic cell is partitioned into a plurality of chambers by said ion-exchange membrane, and one of a positive pole and a negative pole is disposed in each of said chambers.

4. An apparatus according to claim 3, further comprising a first water supply member for supplying drink water to a chamber provided with said positive pole, and a second water supply member for supplying said drink water to a chamber provided with said negative pole;

said first and second water supply members being connected to the water conduit; and said means for measuring the voltage drop measuring potential difference between the first water supply member and the second water supply member.

5. An apparatus according to claim 3, wherein said chamber provided with said positive electrode communicates with an outlet for said acidic ion water and said chamber provided with said negative electrode communicates with an outlet for said alkaline ion water.

6. An apparatus according to claim 1, further comprising means for inputting a voltage which has been set in correspondence with desired ion concentration to said calculator.

* * * * *